(12) United States Patent
Gutierrez et al.

(10) Patent No.: US 8,768,157 B2
(45) Date of Patent: Jul. 1, 2014

(54) MULTIPLE DEGREE OF FREEDOM ACTUATOR

(75) Inventors: Roman C. Gutierrez, Arcadia, CA (US); Robert J. Calvet, Pasadena, CA (US); Ankur Jain, Arcadia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 0 days.

(21) Appl. No.: 13/247,898

(22) Filed: Sep. 28, 2011

(65) Prior Publication Data

US 2013/0077168 A1    Mar. 28, 2013

(51) Int. Cl.
  *G03B 17/00*    (2006.01)
(52) U.S. Cl.
  USPC .......................................... 396/55
(58) Field of Classification Search
  USPC .......... 310/12.03, 12.14; 318/115; 359/199.2, 359/200.6; 396/55
  See application file for complete search history.

(56) References Cited

U.S. PATENT DOCUMENTS

| | | |
|---|---|---|
| 2,774,001 A | 12/1956 | Riedel |
| 4,333,722 A | 6/1982 | Lee |
| 4,384,778 A | 5/1983 | Lee et al. |
| 4,408,857 A | 10/1983 | Frank |
| 4,496,217 A | 1/1985 | Aoyagi |
| 4,716,432 A | 12/1987 | Stephany |
| 4,860,040 A | 8/1989 | Tamamura et al. |
| 5,150,260 A | 9/1992 | Chigira |
| 5,386,294 A | 1/1995 | Ototake et al. |
| 5,699,621 A | 12/1997 | Trumper et al. |
| 5,825,560 A | 10/1998 | Ogura et al. |
| 5,867,302 A | 2/1999 | Fleming |
| 5,986,826 A | 11/1999 | Kosaka et al. |
| 5,995,688 A | 11/1999 | Aksyuk et al. |
| 6,033,131 A | 3/2000 | Ghosh |
| 6,068,801 A | 5/2000 | Bodo et al. |
| 6,205,267 B1 | 3/2001 | Aksyuk et al. |
| 6,239,473 B1 | 5/2001 | Adams |
| 6,262,827 B1 | 7/2001 | Ueda et al. |
| 6,291,875 B1 | 9/2001 | Clark |
| 6,392,703 B1 | 5/2002 | Uchino et al. |
| 6,426,777 B1 | 7/2002 | Sato |
| 6,497,141 B1 | 12/2002 | Turner et al. |

(Continued)

FOREIGN PATENT DOCUMENTS

| | | |
|---|---|---|
| EP | 1959284 | 8/2008 |
| EP | 2264507 | 12/2010 |

(Continued)

OTHER PUBLICATIONS

Tsuboi, O, et al., "A Rotational Comb-Driven Micromirror with a Large Deflection Angle and Low Drive Voltage," Technical Digest. MEMS. IEEE International Conference on Microelectro Mechanical Systems, Jan. 20, 2002, pp. 532-535.

(Continued)

*Primary Examiner* — Clayton E Laballe
*Assistant Examiner* — Noam Reisner
(74) *Attorney, Agent, or Firm* — Haynes and Boone, LLP (57) ABSTRACT

A multiple degree of freedom actuator can have at least one first MEMS actuator configured to move a platform in translation and at least one second MEMS actuator configured to move the platform in a different direction, e.g., tangentially. The first MEMS actuator(s) can facilitate autofocus and/or zoom, for example. The second MEMS actuator(s) can facilitate optical image stabilization (OIS), for example.

27 Claims, 9 Drawing Sheets

(56) References Cited

U.S. PATENT DOCUMENTS

| | | |
|---|---|---|
| 6,535,311 B1 | 3/2003 | Lindquist |
| 6,675,671 B1 | 1/2004 | Jokiel et al. |
| 6,679,055 B1 | 1/2004 | Ellis |
| 6,806,991 B1 | 10/2004 | Sarkar |
| 6,847,907 B1 | 1/2005 | Novotny |
| 6,850,675 B1 | 2/2005 | Calvet et al. |
| 6,914,635 B2 | 7/2005 | Ostergard |
| 6,950,570 B1 | 9/2005 | Novotny |
| 6,958,777 B1 | 10/2005 | Pine |
| 7,027,206 B2 | 4/2006 | Mochizuki |
| 7,038,150 B1 | 5/2006 | Polosky et al. |
| 7,113,688 B2 | 9/2006 | Calvet et al. |
| 7,148,603 B1 | 12/2006 | Garcia |
| 7,154,199 B2 | 12/2006 | Yasuda |
| 7,190,854 B1 | 3/2007 | Novotny |
| 7,266,272 B1 | 9/2007 | Calvet et al. |
| 7,285,879 B2 | 10/2007 | Osaka |
| 7,359,131 B1 | 4/2008 | Gutierrez et al. |
| 7,372,074 B2 | 5/2008 | Milne et al. |
| 7,436,207 B2 | 10/2008 | Rogers et al. |
| 7,477,842 B2 | 1/2009 | Gutierrez |
| 7,545,591 B1 | 6/2009 | Tong et al. |
| 7,555,210 B2 | 6/2009 | Calvet |
| 7,557,470 B2 * | 7/2009 | Culpepper et al. ............... 310/15 |
| 7,579,848 B2 | 8/2009 | Bottoms et al. |
| 7,586,702 B1 | 9/2009 | Huang et al. |
| 7,645,627 B2 | 1/2010 | Christenson |
| 7,646,969 B2 | 1/2010 | Calvet et al. |
| 7,705,909 B2 | 4/2010 | Ishizawa et al. |
| 7,720,366 B2 | 5/2010 | Iwasaki et al. |
| 7,838,322 B1 | 11/2010 | Vargo |
| 7,855,489 B2 | 12/2010 | Hirano |
| 7,872,394 B1 * | 1/2011 | Gritters et al. ................ 310/309 |
| 7,990,628 B1 | 8/2011 | Calvet et al. |
| 8,004,780 B2 | 8/2011 | Gutierrez et al. |
| 8,178,936 B2 | 5/2012 | Zhe et al. |
| 8,299,598 B2 | 10/2012 | Moden |
| 2001/0004420 A1 | 6/2001 | Kuwana et al. |
| 2002/0006687 A1 | 1/2002 | Lam |
| 2002/0070634 A1 | 6/2002 | Tai et al. |
| 2002/0105699 A1 | 8/2002 | Miracky et al. |
| 2002/0125789 A1 | 9/2002 | Brandt |
| 2002/0130586 A1 | 9/2002 | Mao |
| 2003/0026547 A1 | 2/2003 | Trzecieski |
| 2003/0048036 A1 | 3/2003 | Lemkin |
| 2003/0062422 A1 | 4/2003 | Fateley et al. |
| 2003/0063838 A1 | 4/2003 | Hagood |
| 2003/0076421 A1 | 4/2003 | Dutta |
| 2003/0086751 A1 | 5/2003 | Culpepper |
| 2003/0210116 A1 | 11/2003 | Lane et al. |
| 2004/0048410 A1 | 3/2004 | O'Brien et al. |
| 2004/0066494 A1 | 4/2004 | Lee et al. |
| 2004/0136680 A1 | 7/2004 | Medina et al. |
| 2004/0183936 A1 | 9/2004 | Kim et al. |
| 2004/0184132 A1 | 9/2004 | Novotny |
| 2004/0189969 A1 | 9/2004 | Mizuno |
| 2004/0201773 A1 | 10/2004 | Ostergard |
| 2005/0000311 A1 | 1/2005 | Storm |
| 2005/0002008 A1 | 1/2005 | De Weerdt et al. |
| 2005/0002086 A1 | 1/2005 | Starkweather et al. |
| 2005/0007489 A1 | 1/2005 | Ahn et al. |
| 2005/0095813 A1 | 5/2005 | Zhu et al. |
| 2005/0139542 A1 | 6/2005 | Dickensheets et al. |
| 2005/0148433 A1 | 7/2005 | Wang et al. |
| 2005/0156481 A1 | 7/2005 | Zhou et al. |
| 2005/0219399 A1 | 10/2005 | Sato et al. |
| 2005/0249487 A1 | 11/2005 | Gutierrez |
| 2006/0028320 A1 | 2/2006 | Osaka |
| 2006/0033938 A1 | 2/2006 | Kopf et al. |
| 2006/0056084 A1 | 3/2006 | Araki |
| 2006/0092514 A1 | 5/2006 | Koo |
| 2006/0153556 A1 | 7/2006 | Lee et al. |
| 2006/0183332 A1 | 8/2006 | Kang |
| 2006/0192858 A1 | 8/2006 | Calvet |
| 2006/0193618 A1 | 8/2006 | Calvet |
| 2006/0204242 A1 | 9/2006 | Gutierrez et al. |
| 2006/0209012 A1 | 9/2006 | Hagood |
| 2006/0219006 A1 | 10/2006 | Nasiri et al. |
| 2006/0250325 A1 | 11/2006 | Hagood et al. |
| 2006/0252297 A1 * | 11/2006 | Culpepper .................... 439/374 |
| 2006/0277997 A1 | 12/2006 | Foster |
| 2007/0024155 A1 | 2/2007 | Calvet |
| 2007/0133976 A1 | 6/2007 | Gutierrez |
| 2007/0220882 A1 | 9/2007 | Culpepper et al. |
| 2008/0020573 A1 | 1/2008 | Birkmeyer et al. |
| 2008/0044172 A1 | 2/2008 | Tang et al. |
| 2008/0054757 A1 | 3/2008 | Aksyuk |
| 2008/0198249 A1 * | 8/2008 | Tanimura et al. ............. 348/294 |
| 2008/0240704 A1 * | 10/2008 | Takahashi .................... 396/419 |
| 2008/0279498 A1 | 11/2008 | Sampsell et al. |
| 2008/0309191 A1 | 12/2008 | Chou |
| 2009/0031548 A1 | 2/2009 | Zaitsu |
| 2009/0185796 A1 | 7/2009 | Tsutsumi et al. |
| 2009/0213236 A1 | 8/2009 | Chiou |
| 2009/0244302 A1 * | 10/2009 | Tsai ......................... 348/208.99 |
| 2009/0244668 A1 | 10/2009 | Fujino |
| 2009/0284816 A1 | 11/2009 | Davis |
| 2009/0310959 A1 | 12/2009 | Shih et al. |
| 2010/0232777 A1 | 9/2010 | Tseng et al. |
| 2010/0284081 A1 | 11/2010 | Gutierrez |
| 2011/0026148 A1 | 2/2011 | Tanimura et al. |

FOREIGN PATENT DOCUMENTS

| | | |
|---|---|---|
| JP | 2006-297543 | 11/2006 |
| JP | 2008-010624 | 1/2008 |
| JP | 2010-145264 | 7/2010 |
| JP | 2010-167536 | 8/2010 |
| KR | 2008/0079115 | 8/2008 |
| WO | WO02/063371 | 8/2002 |
| WO | WO2008/061025 | 5/2008 |
| WO | WO2010/038229 | 4/2010 |

OTHER PUBLICATIONS

Yi, Chu, et al., "Design, Fabrication and Control of Components in MEMS-Based Optical Pickups," IEEE Transactions on Magnetics, IEEE Service Center, New York, US, vol. 17, No. 2, Feb. 1, 2007, pp. 780-784.

Minching, Wu, et al., "Development of Tracking and Focusing Micro Actuators for Dual-Stage Optical Pick-Up Head," Journal of Optics. A, Pure and Applied Optics, Institute of Physics Publishing, Bristol, GB, vol. 8, No. 7, Jul. 1, 2006, pp. S323-S329.

Seong-Hyok Kim, et al., Integrated Micro Optical Flying Head with Lens Positioning Actuator for Small Form Factor Data Storage, Transducers '03. 12$^{th}$ International Conference on Solid-State Sensors, Actuators and Microsystems. Digest of Technical Papers (Cat. No. 03TH8664), vol. 1, Jan. 1, 2003, pp. 607-610.

Sunghoon, Kwon, et al., "Large Displacement Vertical Microlens Scanner wit Low Driving Voltage," IEEE Photonics Technology Letters, IEEE Service Center, Piscataway, NJ, US, vol. 14, No. 11, Nov. 1, 2002.

PCT/US 06/07024 Search Report of Nov. 28, 2007.

Akihiro Koga et al. "Electrostatic Linear Microactuator Mechanism for Focusing a CCD Camera"; Journal of Lightwave Technology, vol. 17, No. 1: p. 43-47; Jan. 1999.

Takahashi, K., et al.; "Switched-Layer Design for SOI Bulk Micromachined XYZ Stage Using Stiction Bar for Interlayer Electrical Connection," Journal of Microelectromechanical Systems, IEEE Service Center, US, vol. 18, No. 4, pp. 818-827, Aug. 1, 2009.

\* cited by examiner

MULTIPLE DEGREE OF FREEDOM ACTUATOR

TECHNICAL FIELD

One or more embodiments relate generally to microelectromechanical systems (MEMS) and, more particularly, to MEMS electrostatic actuators.

BACKGROUND

Microelectromechanical systems (MEMS) actuators are well known. Examples of MEMS actuators include comb drives, scratch drives, and thermal drives. MEMS actuators can be made using integrated circuit (IC) fabrication techniques. MEMS actuators can be used in a variety of applications.

For example, MEMS drives can be used move a lens so as to facilitate the focusing of a miniature camera. As such, it would be beneficial to provide improved MEMS drives for such applications.

SUMMARY

In accordance with an embodiment, a device can comprise at least one first MEMS actuator configured to move a platform in translation along a first axis. At least one second MEMS actuator can be configured to move the platform in a direction that is generally perpendicular to the first axis.

In accordance with an embodiment, an actuator assembly can comprise at least one first MEMS actuator configured to move a platform in translation and at least one second MEMS actuator configured to move, e.g., rotate, the platform tangentially.

In accordance with an embodiment, a MEMS actuator assembly can comprise a plurality of nested actuators configured to focus a camera and to provide optical image stabilization for the camera.

In accordance with an embodiment, a method for operating a camera can comprise moving a platform in translation with at least one first MEMS actuator and moving the platform tangentially with at least one second MEMS actuator.

In accordance with an embodiment, a multiple degree of freedom actuator can comprise a fixed frame, a platform that is movable with respect to the fixed frame, and three independently movable MEMS actuators interconnecting the fixed frame and the platform. The three MEMS actuators can be configured to cooperate to move the platform in three degrees of freedom.

In accordance with an embodiment, a method can comprise providing a platform that is movable with respect to a fixed frame. The platform can be moved in three degrees of freedom using three independently movable MEMS actuators.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

A multiple degree of freedom actuator suitable for use in a wide variety of different electronic devices is disclosed in accordance with various embodiments. The multiple degree of freedom actuator may be adapted for use in a camera, such as a miniature camera, for example.

The multiple degree of freedom actuator may be used to either manually or automatically focus the miniature camera. The multiple degree of freedom actuator may be used to zoom the miniature camera. The multiple degree of freedom actuator may be used to facilitate centration of an optical element. The multiple degree of freedom actuator may be used to provide optical image stabilization (OIS) for the miniature camera. The multiple degree of freedom actuator may be used to align optics (such as to actively align the optics during use thereof), e.g., provide fine alignment for lenses or other optical elements, within the camera. The multiple degree of freedom actuator may be used for optical correction, e.g., to mitigate undesirable effects of flaws in optical elements. For example, a lens may be rotated to place a defect therein in a more desirable (or less harmful) position. The multiple degree of freedom actuator may be used for any other desired application in an electronic device or in any other device.

In accordance with one or more embodiments, the multiple degree of freedom actuator may comprise one or more MEMS actuators. For example, the multiple degree of freedom actuator may comprise linear comb drives and rotational comb drives.

The multiple degree of freedom actuator may be formed using monolithic construction. The multiple degree of freedom actuator may be formed using non-monolithic construction. The multiple degree of freedom actuator may be formed using contemporary fabrication techniques, such as etching and/or micromachining, for example. Various other fabrication techniques are contemplated.

The multiple degree of freedom actuator may be formed of silicon (e.g., single crystal silicon and/or polycrystalline silicon). The multiple degree of freedom actuator may be formed of various semiconductor materials such as silicon, germanium, diamond, and/or gallium arsenide. The material of which the multiple degree of freedom actuator is formed may be doped to obtain a desired conductivity thereof. The multiple degree of freedom actuator may be formed of a metal such as tungsten, titanium, germanium, aluminum, and/or nickel. Any desired combination of these and other materials may be used.

Motion control of the multiple degree of freedom actuator and/or items moved by the multiple degree of freedom actuator is disclosed in accordance with various embodiments. The motion control may be used to facilitate a desired movement of an item while mitigating undesired movement of the item. For example, the motion control may be used to facilitate movement of a lens along an optical axis of the lens, while inhibiting other movements of the lens. Thus, the motion control may be used to provide focusing and/or zoom by facilitating movement of the lens in single desired translational degree of freedom while inhibiting movement of the lens in all other translational degrees of freedom and while inhibiting movement of the lens in all rotational degrees of freedom.

In another example, the motion control may facilitate movement of the lens in all three translational degrees of freedom while inhibiting movement of the lens in all three rotational degrees of freedom. For example, focusing and/or zoom, as well as optical image stabilization, may be facilitated by providing movement of the lens in all three translational degrees of freedom while inhibiting movement of the lens in all three rotational degrees of freedom.

Thus, an enhanced miniature camera for standalone use and for use in electronic devices may be provided. The miniature camera is suitable for use in a wide variety of different electronic devices. For example, the miniature camera is suitable for use in electronic devices such as cellular telephones, laptop computers, televisions, handheld devices, tablets, car cameras, web cams, and surveillance devices.

According to various embodiments, smaller size and enhanced shock resistance are provided. Enhanced shock resistance can result from the smaller size (and the consequent lower mass) of the miniature camera and its components. Enhanced shock resistance can result from features of the multiple degree of freedom actuator discussed herein.

Figure 1:
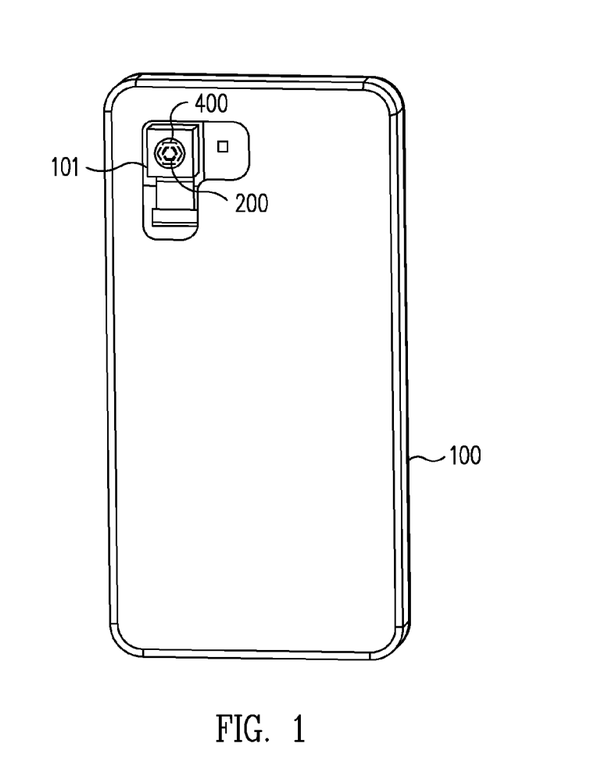
FIG. 1 shows an electronic device having a multiple degree of freedom actuator, in accordance with an embodiment.

FIG. 1 shows an electronic device 100 having a miniature camera 101 in accordance with an embodiment. The miniature camera 101 can have a multiple degree of freedom actuator 400, such as in a lens barrel 200 thereof. The multiple degree of freedom actuator 400 can facilitate focus, zoom, optical image stabilization and/or optical correction as discussed herein.

The electronic device 100 may be a cellular telephone, a laptop computer, a surveillance device, or any other desired device. The miniature camera 101 may be built into the electronic device 100, may be attached to the electronic device 100, or may be separate (e.g., remote) with respect to the electronic device 100.

Figure 2:
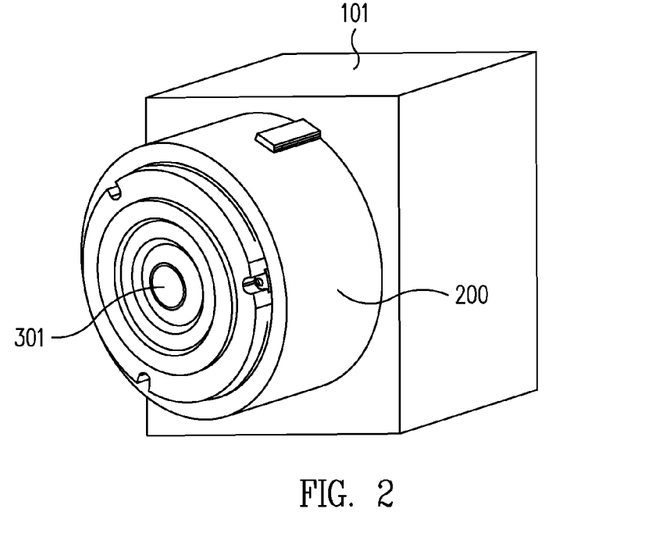
FIG. 2 shows a miniature camera having a lens barrel, in accordance with an embodiment.

FIG. 2 shows the miniature camera 101 having the lens barrel 200 extending therefrom, in accordance with an embodiment. The lens barrel 200 may contain one or more optical elements, such as a movable lens 301, which may be moved by the multiple degree of freedom actuator 400 (see FIG. 5). The lens barrel 200 may have one or more optical elements which may be fixed. For example, the lens barrel 200 may contain one or more lenses, apertures (variable or fixed), shutters, mirrors (which may be flat, non-flat, powered, or non-powered), prisms, spatial light modulators, diffraction gratings, lasers, LEDs and/or detectors. Any of these items may be fixed or may be movable by the multiple degree of freedom actuator 400.

The multiple degree of freedom actuator 400 may be used in non-camera applications. The multiple degree of freedom actuator 400 may be used to move either optical or non-optical devices in various applications. For example, the multiple degree of freedom actuator 400 may be used to move samples that are provided for scanning. The samples may be either biological samples or non-biological samples.

Examples of biological samples include organisms, tissues, cells, and proteins. Examples of non-biological samples include integrated circuits, MEMS devices, solids, liquids, and gases. The multiple degree of freedom actuator 400 may be used to manipulate structures, light, sound, or any other desired thing.

The optical elements may be partially or fully contained within the lens barrel 200. The lens barrel 200 may have any desired shape. For example, the lens barrel 200 may be substantially round, triangular, rectangular, square, pentagonal, hexagonal, octagonal, or of any other shape or cross-sectional configuration. The lens barrel 200 may be either permanently or removably attached to the miniature camera 101. The lens barrel 200 may be defined by a portion of a housing of the miniature camera 101. The lens barrel 200 may be partially or completely disposed within the miniature camera 101.

Figure 3A:
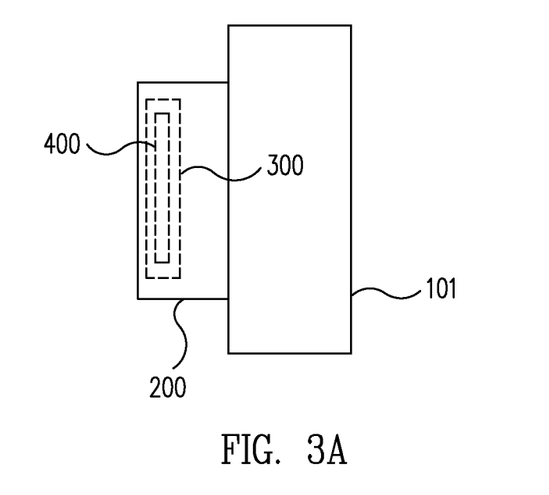
FIG. 3A shows miniature camera with the lens barrel having the actuator module disposed therein, in accordance with an embodiment.

FIG. 3A shows an actuator module 300 disposed within the lens barrel 200, in accordance with an embodiment. The actuator module 300 may contain the multiple degree of freedom actuator 400. The multiple degree of freedom actuator 400 may be completely contained within the lens barrel 200, partially contained within the lens barrel 200, or completely outside of the lens barrel 200. The multiple degree of freedom actuator 400 may be adapted to move optical elements contained within the lens barrel 200, optical elements not contained within the lens barrel 200, and/or any other desired items.

Figure 3B:
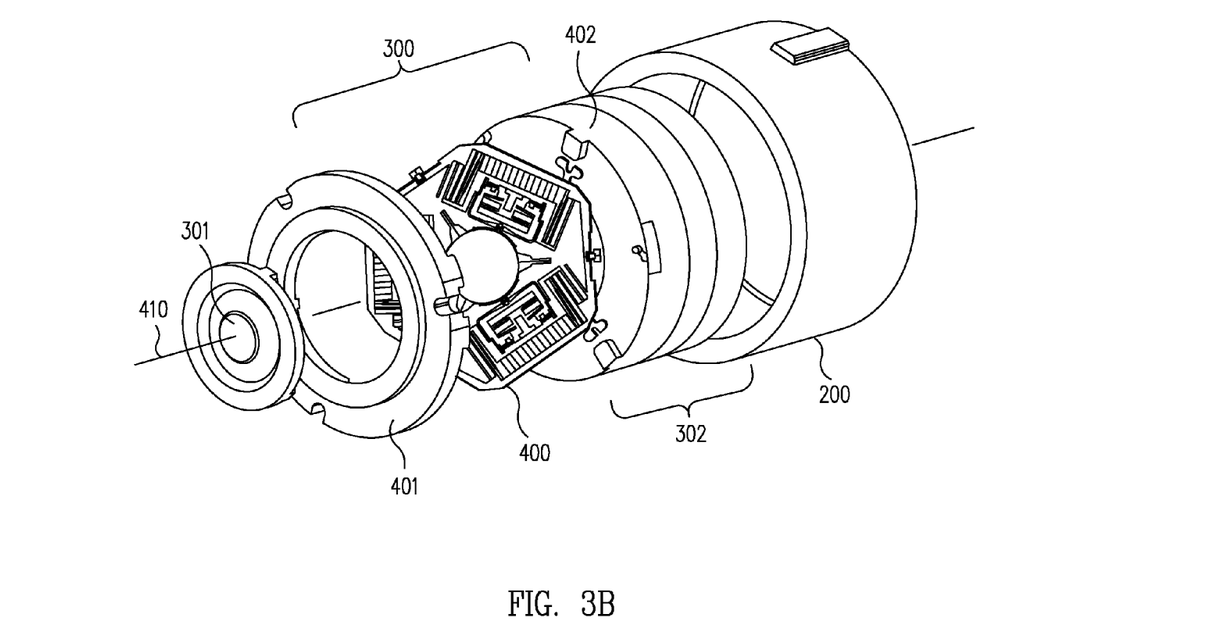
FIG. 3B shows the lens barrel and the actuator module in an exploded view, in accordance with an embodiment.

FIG. 3B shows the lens barrel 200 and the actuator module 300 in an exploded view, in accordance with an embodiment. The movable lens 301 is an example of an optical element that may be attached to or in mechanical communication with the multiple degree of freedom actuator 400 and may be moved thereby. The movable lens 301 can be moved along an optical axis 410 of the miniature camera 101 to facilitate focus and/or zoom, for example. The multiple degree of freedom actuator 400 may be disposed between an upper module cover 401 and a lower module cover 402.

Additional optical elements, such as fixed (e.g., stationary) lenses 302 may be provided. The additional optical elements may facilitate focus, zoom, and/or optical image stabilization, for example. Any desired number and/or type of movable (such as via the multiple degree of freedom actuator 400) and fixed optical elements may be provided.

Figure 4:
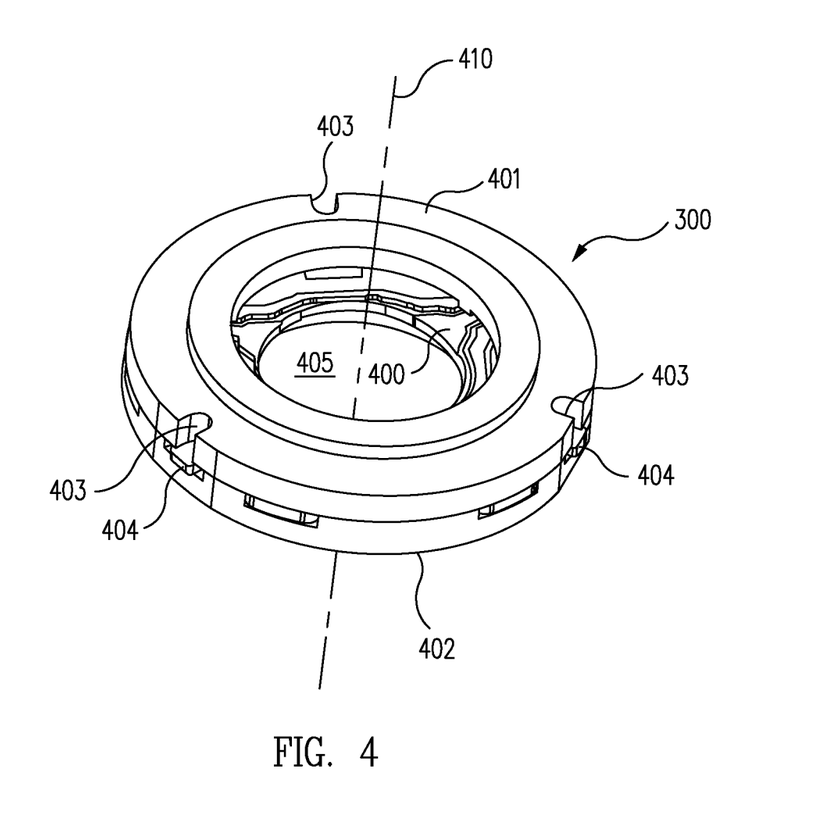
FIG. 4 shows the actuator module having the multiple degree of freedom actuator disposed therein, in accordance with an embodiment.

FIG. 4 shows the actuator module 300, in accordance with an embodiment. The actuator module 300 may be disposed partially or completely within the miniature camera 101. The multiple degree of freedom actuator 400 may be disposed partially or completely within the actuator module 300. For example, the multiple degree of freedom actuator 400 may be sandwiched substantially between an upper module cover 401 and a lower module cover 402.

The actuator module 300 may have any desired shape. For example, the actuator module 300 may be substantially round, triangular, square, rectangular, pentagonal, hexagonal, octagonal, or of any other shape or cross-sectional configuration.

In an embodiment, the lens barrel 200 may be substantially round in cross-sectional configuration and the actuator module 300 may be substantially round in cross-sectional configuration. The use of a substantially round lens barrel 200 and a substantially round actuator module 300 may facilitate an advantageous reduction in size. The reduction in size may be facilitated, for example, because round lenses are commonly preferred. The use of a substantially round lens barrel 200 and a substantially round actuator module 300 with round lenses tends to result in a reduction of wasted volume and thus tends to facilitate a reduction in size.

As discussed herein, one or more optical elements, such as the movable lens 301, may be disposed in an opening 405 (e.g., a hole) formed in the actuator module 300. The multiple degree of freedom actuator 400 may effect movement of the optical elements along their optical axis 410, for example. Thus, the multiple degree of freedom actuator 400 may move one or more lenses, such as lens 301, to effect focusing or zoom, for example.

The actuator module 300 may have cutouts 403 formed therein to facilitate assembly of the actuator module 300 and alignment of the multiple degree of freedom actuator 400 contained therein. The cutouts 403 and/or electrical contacts 404 partially disposed within the cutouts 403 may be used to facilitate alignment of the actuator module 300 with respect to the lens barrel 200.

Figure 5:
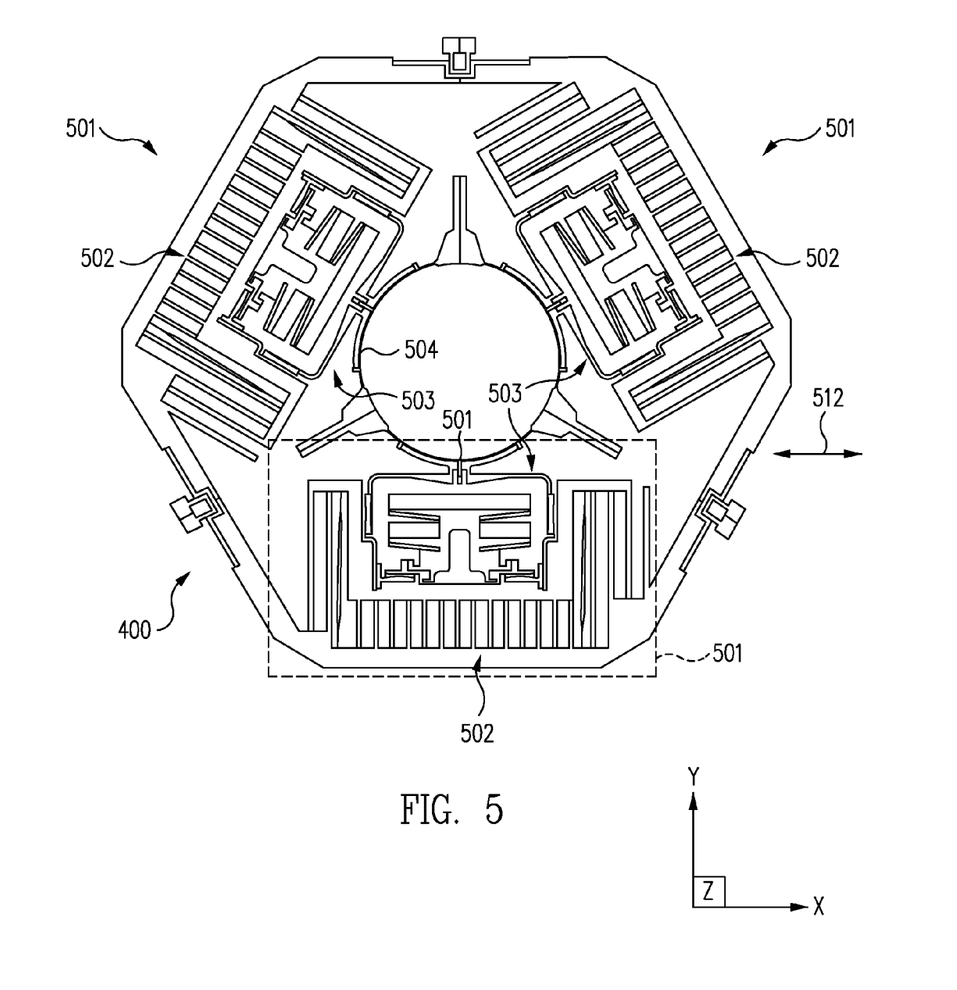
FIG. 5 shows a multiple degree of freedom actuator, in accordance with an embodiment of the invention.

FIG. 5 shows the multiple degree of freedom actuator 400, in accordance with an embodiment of the invention. The multiple degree of freedom actuator 400 can provide motion controlled movement in six degrees of freedom for used in a variety of applications. The multiple degree of freedom actuator 400 can provide three degrees of linear or translational motion and three degrees of angular or rotational motion.

The multiple degree of freedom actuator 400 can comprise three substantially identical sectors 501. Each sector 501 can comprise both a tangential or in-plane actuator 502 and a Z-motion or out-of-plane actuator 503. The in-plane actuators 502 can be linear electrostatic comb drives, for example. The out-of-plane actuators 503 can be rotational electrostatic comb drives, for example. The out-of-plane actuators 503 can be linear, e.g., vertical or 2-axis, electrostatic comb drives, for example. Each of the in-plane actuators 502 and each of the out-of-plane actuators 503 can be independently controllable and movable with respect to one another.

The in-plane actuators 502 and the out-of-plane actuators 503 can control the motion of a platform 504. The platform 504 can define a lens ring and can be used to mount one or more lenses. For example, the platform 504 can mount the lens 301, which can be a focusing lens and/or a zoom lens. The platform 504 can be moved in all six degrees of freedom.

Since the platform 504 can be moved in all six degrees of freedom, it can facilitate focus, zoom, optical image stabilization, optical element alignment, and/or optical correction for example. Focus and/or zoom can be facilitated by translating one or more lenses along a z-axis. Optical image stabilization and/or optical element alignment can be facilitated by translating one or more lenses or another optical element within an x-y plane and/or by rotating the lens or other optical element(s) about an x-axis and/or a y-axis.

Although FIG. 5 shows the multiple degree of freedom actuator 400 as having three in-plane actuators 502, the multiple degree of freedom actuator 400 can have any number of in-plane actuators 502. For example, the multiple degree of freedom actuator 400 can have one, two, three, four, five, six, or more in-plane actuators 502.

Each in-plane actuator 502 can provide tangential movement of the platform 504. That is, each in-plane actuator 502 can move a point 511 on a periphery of the platform 504 in a direction that is substantially tangential with respect to the periphery of the platform 504, as indicated by arrow 512.

All of the in-plane actuators 502 can cooperate to provide translational movement of the platform 504 within the x-y plane (within the plane of the multiple degree of freedom actuator 400). Such x-y plane movement of the platform 504 can be used to translate the lens 301 for optical image stabilization or alignment, for example.

All of the in-plane actuators 502 can cooperate to provide z-axis rotational movement of the platform 504. Such z-axis rotational movement can be used to rotate a direction sensitive optical element, such as a polarizer or a diffraction grating, for example.

Although FIG. 5 shows the multiple degree of freedom actuator 400 as having three out-of-plane actuators 503, the multiple degree of freedom actuator 400 can have any number of out-of-plane actuators 503. For example, the multiple degree of freedom actuator 400 can have one, two, three, four, five, six, or more out-of-plane actuators 503.

The out-of-plane actuators 503 can cooperate to provide translational movement of the platform 504 along the z-axis (which is perpendicular with respect to the plane of the multiple degree of freedom actuator 400). Such z-axis movement of the platform 504 can be used to translate the lens 301 for focus and/or zoom, for example. The out-of-plane actuators 503 can cooperate to provide rotational movement of the platform 504 about the x-axis and/or y-axis. Such rotational movement can be used to rotate the lens 301 for optical image stabilization or alignment, for example.

Figure 6:
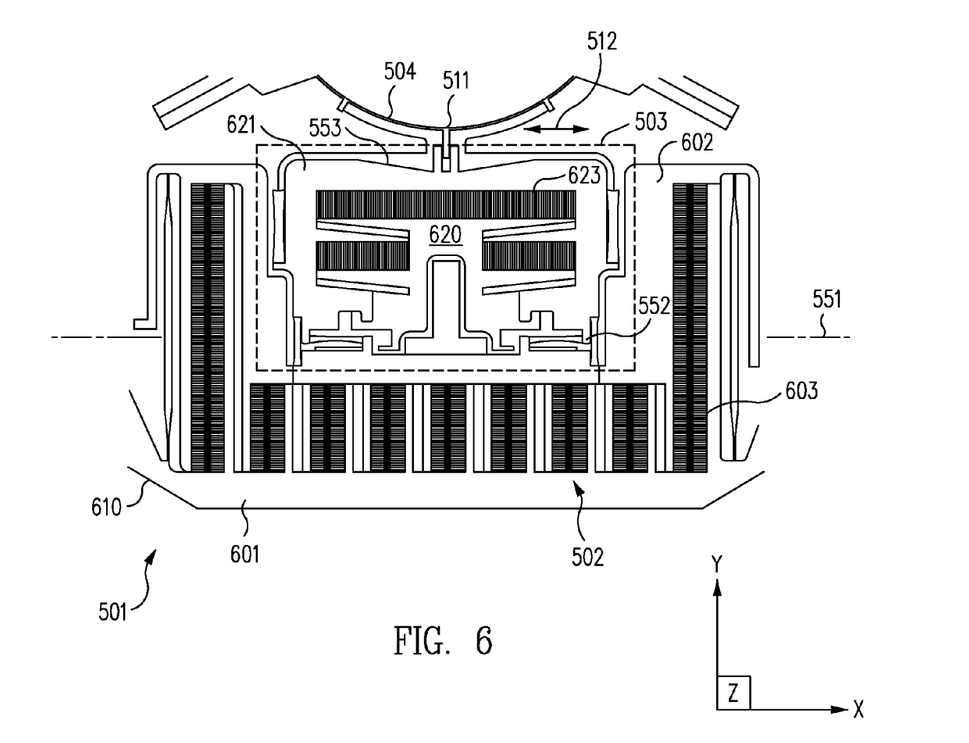
FIG. 6 is an enlarged view showing one sector of the multiple degree of freedom actuator of FIG. 5, in accordance with an embodiment of the invention.

FIG. 6 is an enlarged view showing one sector 501 of the multiple degree of freedom actuator 400 of FIG. 5, in accordance with an embodiment of the invention. As shown in FIG. 5, the multiple degree of freedom actuator 400 comprises three sectors 501. The multiple degree of freedom actuator 400 can comprise any desired number of sectors 501. For example, the multiple degree of freedom actuator 400 can comprise one, two, three, four, five, six, or more sectors 501.

The in-plane actuators 502 can each comprise a fixed x-y frame 601 and a movable x-y frame 602. Comb fingers or teeth 603 can extend from the fixed x-y frame 601 and the movable x-y frame 602 and can cooperate to define an electrostatic actuator that effects substantially linear movement of the movable x-y frame 602 with respect to the fixed x-y frame 601. The movable x-y frame 602 moves within the x-y plane. The movable x-y frame 602 moves back and forth in the directions indicated by arrow 512.

The fixed x-y frame 601 of each sector 501 can cooperate to define an outer frame 610 of the multiple degree of freedom actuator 400. The outer frame 610 can substantially rigidly interconnect each of the sectors 501 to one another.

The out-of-plane actuators 503 can each comprise an out-of plane, deployed z-frame 620 and a movable z-frame 621. Comb fingers or teeth 623 can extend from the deployed z-frame 620 and the movable z-frame 621 and can cooperate to define an electrostatic actuator that effects movement of the movable z-frame 621 with respect to the deployed z-frame 620. The movable z-frame 621 rotates so as to provide movement of at least a portion of the platform 504 substantially along the z axis.

The deployed z-frame 620 can be deployed to a position such that the deployed z-frame 620 is angularly disposed with respect to the plane of the multiple degree of freedom actuator

400. That is, the deployed z-frame 620 can be rotated about a hinge line 551 that passes through a proximal portion 552 of the deployed z-frame 620 so as to cause a distal portion 553 of the deployed z-frame 620 to move out of the plane of the multiple degree of freedom actuator 400 and into the deployed position of the deployed z-frame 620. The deployed position of the deployed z-frame 620 can be either above or below (on either side of) the plane of the multiple degree of freedom actuator 400.

Figure 7:
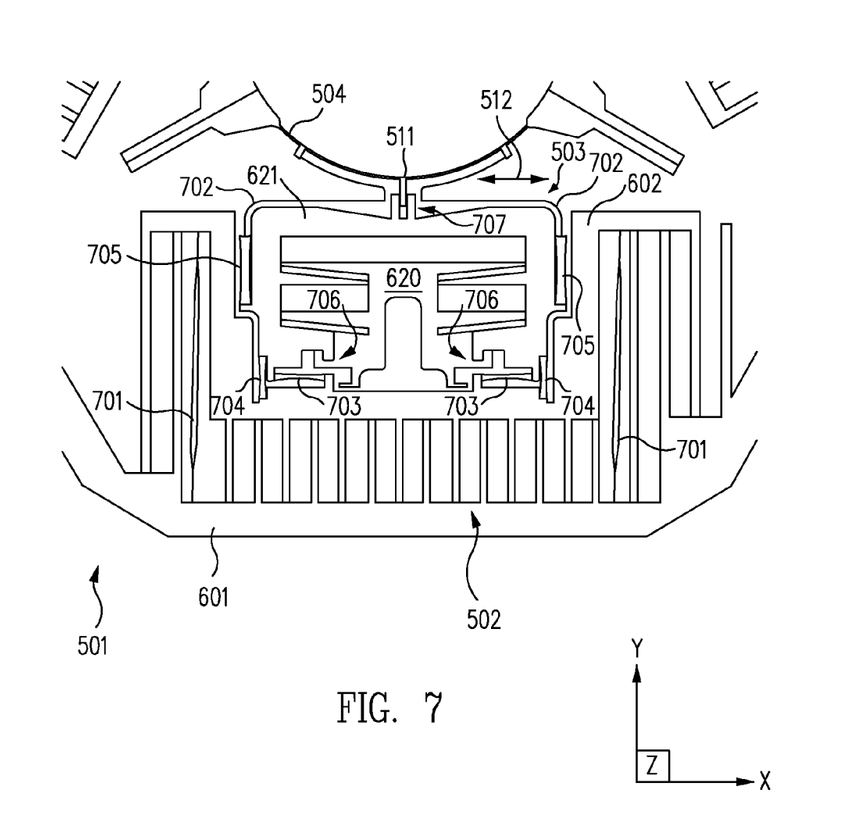
FIG. 7 shows the sector of FIG. 6 with the comb drive teeth removed 8 for clarity, in accordance with an embodiment of the invention

FIG. 7 shows the sector of FIG. 6 with the teeth 603 and 623 removed for clarity, in accordance with an embodiment of the invention. Motion control features can be used to limit the motion of the in-plane actuators 502 and the out-of-plane actuators 503. The motion control features can consequently limit the motion of the platform 504, since the motion of the platform 504 is controlled by the in-plane actuators 502 and the out-of-plane actuators 503.

For example, tangential movement flexures 701, cantilever flexures 702, torsional flexures 703, outer hinge flexures 704, and inner hinge flexures 705 can be used to facilitate motion control.

The tangential movement flexures 701 can facilitate lateral movement of the in-plane actuators 502 so as to provide tangential movement of the platform 504. This can be done while the tangential movement flexures 701 inhibit movement of the in-plane actuators 502 in other degrees of freedom.

The cantilever flexures 702 can transfer z-axis motion of the out-of-plane actuators 503 to the platform 504 while accommodating the varying distance between out-of-plane actuators 503 and the platform 504. This can be done while the cantilever flexures 702 inhibit movement of the out-of-plane actuators 503 in other degrees of freedom.

The torsional flexures 703 can facilitate rotational movement of the movable z-frames 621 of the out-of-plane actuators 503 so as to provide movement of the platform 504 along the z-axis. This can be done while the torsional flexures 703 inhibit movement of the movable z-frames 621 in other degrees of freedom. In particular, the torsional flexures 703 inhibit movement of the movable z-frames 621 along the x axis.

The outer hinge flexures 704 can facilitate rotational movement of the movable z-frame 621 of the out-of-plane actuators 503 so as to provide movement of the platform 504 along the z-axis. This can be done while the outer hinge flexures 704 inhibit movement of the movable z-frame 621 in other degrees of freedom. In particular, the outer hinge flexures inhibit movement of the y direction.

The inner hinge flexures 705 can facilitate rotational movement of the out-of-plane actuators 503 as the cantilever flexures 702 transfer z-axis motion of the out-of-plane actuators 503 to the platform 504. This can be done while the inner hinge flexures 705 inhibit movement of the platform 504 in other degrees of freedom.

Each of the out-of-plane actuators 503 can have two proximal lateral snubber assemblies 706 and one distal lateral snubber assembly 707 to provide further motion control, for example. The proximal lateral snubber assemblies 706 can inhibit lateral movement of the movable z-frame 621 with respect to the deployed z-frame 620. The distal lateral snubber assembly 707 can inhibit later movement of the platform 504 with respect to the movable z-frame 621.

Figure 8:
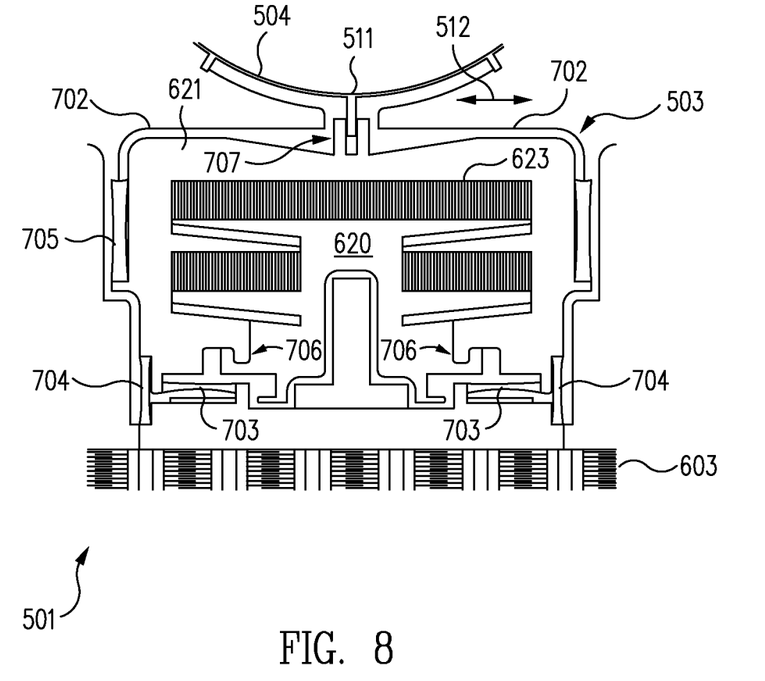
FIG. 8 is an enlarged view showing the out-of-plane actuator of FIG. 7, in accordance with an embodiment of the invention.

FIG. 8 is an enlarged view showing the out-of-plane actuator of FIG. 7, in accordance with an embodiment of the invention. The teeth 603 of the in-plane actuators 502 and the teeth 623 out-of-plane actuators 503 are shown.

Figure 9:
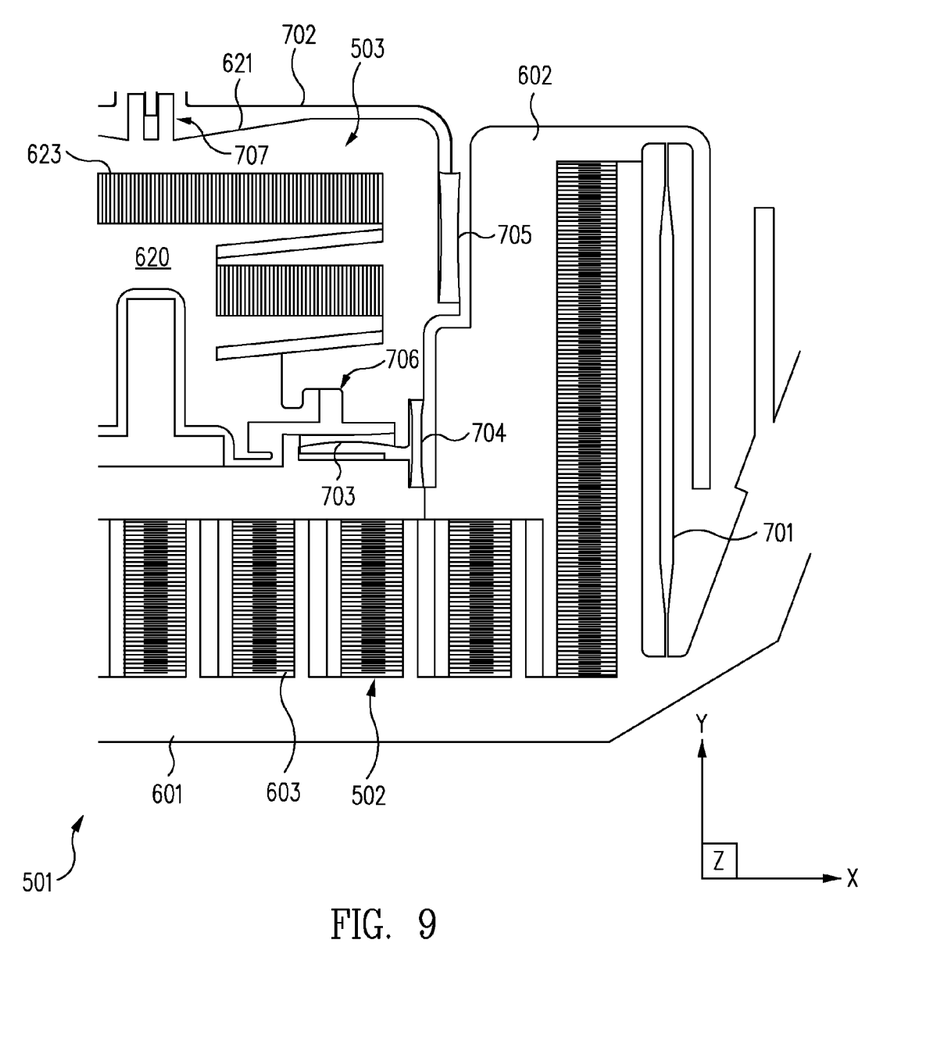
FIG. 9 is an enlarged view showing a portion of the in-plane actuator and a portion of the out-of-plane actuator of FIG. 6, in accordance with an embodiment of the invention.

FIG. 9 is an enlarged view showing a portion of the in-plane actuator of FIG. 9, in accordance with an embodiment of the invention. Some of the motion control features can be more clearly seen in this view. For example, one of the tangential movement flexures 701, one of the cantilever flexures 702, one of the torsional flexures 703, one of the outer hinge flexures 704, and one of the inner hinge flexures 705 can be more clearly seen.

In operation, the three out-of-plane actuators 503 can move in unison to translate one or more lenses and thus facilitate focus and/or zoom. The three out-of-plane actuators 503 can move independently to rotate one or more lenses to facilitate optical image stabilization or alignment of the lens(es). The three in-plane actuators 502 can move independently to translate one or more lenses or another optical element to facilitate optical image stabilization or alignment of the lens(es) or optical element.

Any of the in-plane actuators 502 and the out-of-plane actuators 503 can be biased or moved to a given position that can be considered a zero or centered position. The centered position can be anywhere along the range of travel for the in-plane actuators 502 and the out-of-plane actuators 503. The centered position can be an aligned position of the lens(s) or other optical elements. The in-plane actuator(s) 502 and/or the out-of-plane actuator(s) 503 can remain in this centered position until driven to a different position to effect focus, zoom, or optical image stabilization.

The state or position of each of the in-plane actuators 502 and each of the out-of-plane actuators 503 can be controlled by providing a control signal or voltage thereto. Generally, higher voltages will result in greater movement of the in-plane actuators 502 and the out-of-plane actuators 503.

Figure 10:
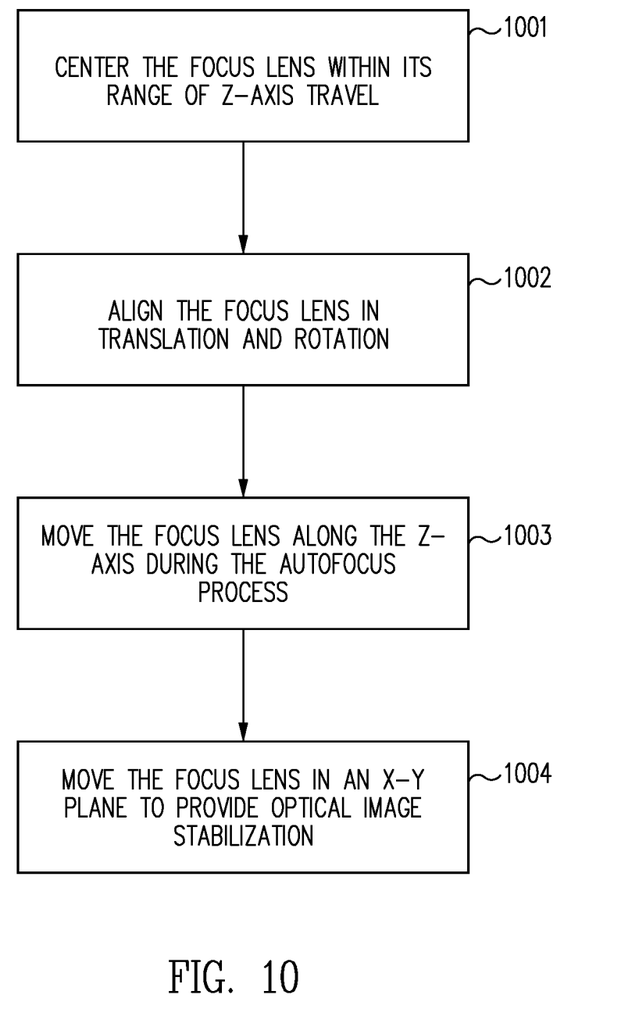
FIG. 10 is a flow chart showing an example of operation of the multiple degree of freedom actuator, in accordance with an embodiment of the invention.

FIG. 10 is a flow chart showing an example of operation of the multiple degree of freedom actuator 400, in accordance with an embodiment of the invention. On power up of the electronic device 100 and/or the miniature camera 101, the in-plane actuators 502 and/or the out-of-plane actuators 503 can move the lens 301 to an aligned position proximate a center of travel of the lens 301.

More particularly, the out-of-plane actuators 503 can move the lens to a position proximate the center of travel of the lens 301, as indicated in block 1001 and the in-plane actuators 502 can cooperate with the out-of-plane actuators 503 to align the lens in all six degrees of freedom, as indicated in block 1002.

During an autofocus process, the lens 301 can be moved by the out-of-plane actuators 503 to a position that provides a desired focus of the miniature camera 101, as indicated in block 1003. This movement can be accomplished while maintaining the alignment of the lens 301.

During an optical image stabilization process, the in-plane actuators 502 and/or the out-of-plane actuators 503 can cooperate to move the lens 301 in a manner that provides optical image stabilization as indicated in block 1004. Aligning the lens 301, focusing with the lens 301, and providing optical image stabilization with the lens 301 can occur serially, in parallel with one another, or partially serially and partially in parallel (e.g. can overlap) with one another.

An improved MEMS actuator has multiple degrees of freedom. The improved MEMS actuator has motion control to limit undesirable movement. The improved MEMS actuator is suitable for use in a miniature camera to facilitate focus, zoom, optical image stabilization, and/or alignment of optical elements for example.

The improved MEMS actuator can embed or nest plural electrostatic drives, such as linear and rotational comb drives,

What is claimed as new and desired to be protected is:

1. A device comprising:
   at least one first MEMS actuator configured to move a platform in translation along a first axis; and
   at least one second MEMS actuator configured to move the first MEMS actuator in a direction that is generally perpendicular to the first axis;
   wherein at least one of the at least one first and second MEMS actuators comprises a fixed frame and a moveable frame, at least one of the movable frame and the fixed frame being deployed at an angle relative to a plane of the device and the moveable frame being rotatable relative to the fixed frame about a hinge line lying in the plane of the device and passing through a portion of the fixed frame, and
   wherein the second MEMS actuator(s) define a plane and at least a portion of each first MEMS actuator is deployed to a position out of the plane to define a rotational comb drive.

2. The device as recited in claim 1, wherein the first MEMS actuator(s) comprise a plurality of independently actuatable actuators.

3. The device as recited in claim 1, wherein the second MEMS actuator(s) comprise a plurality of independently actuatable actuators.

4. The device as recited in claim 1, wherein the first MEMS actuator(s) comprise a plurality of substantially identical actuators.

5. The device as recited in claim 1, wherein the second MEMS actuator(s) comprise a plurality of substantially identical actuators.

6. The device as recited in claim 1, wherein three first MEMS actuators are configured to cooperate to move the platform.

7. The device as recited in claim 1, wherein three first MEMS actuators are configured to cooperate to rotate the platform about a second axis and a third axis that are perpendicular to the first axis.

8. The device as recited in claim 1, wherein three second MEMS actuators are configured to cooperate to move the platform.

9. The device as recited in claim 1, wherein three second MEMS actuators are configured to cooperate to move the platform in any direction within a plane that is perpendicular to the first axis.

10. The device as recited in claim 1, where the three second MEMS actuators are configured to rotate the platform about the first axis.

11. The device as recited in claim 1, wherein the first MEMS actuator(s) are nested at least partially within the second MEMS actuator(s).

12. The device as recited in claim 1, wherein each of the first MEMS actuators is nested within one of the second MEMS actuators.

13. The device as recited in claim 1, wherein the first MEMS actuator(s) comprise rotational comb drives.

14. The device as recited in claim 1, wherein the platform comprises a lens ring.

15. The device as recited in claim 1, wherein the first MEMS actuator(s) are configured to facilitate focusing of a camera.

16. The device as recited in claim 1, wherein the second MEMS actuator(s) are configured to facilitate optical image stabilization of a camera.

17. The device as recited in claim 1, wherein the device is a camera.

18. The device as recited in claim 1, wherein the device is a cellular telephone.

19. The device as recited in claim 1, further comprising a MEMS actuator assembly comprising a plurality of nested MEMS actuators configured to focus a camera and to provide optical imaging stabilization for the camera, wherein the plurality of nested MEMS actuators include the at least one first MEMS actuator and the at least second MEMS actuator, and wherein each actuator comprises a moveable frame and a fixed frame, and wherein at least the movable frames of the actuators are all disposed in a common plane when none of the actuators is acutated.

20. A method for operating a camera, the method comprising:
   moving a platform in translation with at least one first MEMS actuator; and
   moving the first MEMS actuator tangentially with respect to the platform using at least one second MEMS actuator, wherein
   the at least one first MEMS actuator comprises a fixed frame and a moveable frame disposed at an angle relative to each other about a common hinge line,
   the moving of the platform in translation comprises rotating the moveable frame about the hinge line and relative to the fixed frame,
   the camera further comprises a flexure interconnecting the first MEMS actuator and the platform, and
   the flexure comprises a hinge flexure that is flexible along direction of a first axis and a cantilever flexure that is rigid along the direction of the first axis.

21. The method as recited in claim 20, wherein:
   an optical element is attached to the platform; and
   moving the platform effects centration of the optical element.

22. The method as recited in claim 20, wherein:
   an optical element is attached to the platform; and
   moving the platform effects alignment of the optical element, 23. The device as recited in claim 1, further comprising a flexure interconnecting the first MEMS actuator and the platform.

24. The device as recited in claim 23, wherein the flexure comprises a hinge flexure that is flexible along a direction of the first axis and a cantilever flexure that is rigid along the direction of the first axis, 25. The device as recited in claim 1, wherein the portion of each first MEMS actuator is rotated about a hinge to a position out of the plane.

26. A lens barrel comprising the MEMS actuator assembly of claim 19 and an optical element disposed within the lens barrel and configured to be moved by the MEMS actuator assembly.

27. An electronic device comprising the MEMS actuator assembly of claim 19, the MEMS actuator assembly further comprising the camera, wherein the MEMS actuator assembly is disposed in the camera.

\* \* \* \* \*

UNITED STATES PATENT AND TRADEMARK OFFICE
CERTIFICATE OF CORRECTION

| | | |
|---|---|---|
| PATENT NO. | : 8,768,157 B2 | Page 1 of 1 |
| APPLICATION NO. | : 13/247898 | |
| DATED | : July 1, 2014 | |
| INVENTOR(S) | : Roman C. Gutierrez et al. | |

It is certified that error appears in the above-identified patent and that said Letters Patent is hereby corrected as shown below:

In the Claims:

In column 10, line 21:

Change the word "imaging" to --"image"--

In column 10, line 25:

Change the word "movable" to --"moveable"--

In column 10, line 27:

Change the word "acutated" to --"actuated"--

In column 10, line 44:

Change "direction of a first axis" to --"a direction of a first axis"--

In column 10, line 60:

Change "axis," to --"axis."--

Signed and Sealed this
Second Day of September, 2014

Michelle K. Lee
*Deputy Director of the United States Patent and Trademark Office*